Aug. 25, 1970   HIROSHI UOTANI ET AL   3,525,654
METHOD OF MANUFACTURING A RADIAL TIRE AND PNEUMATIC TIRE
MANUFACTURED THEREBY
Filed March 21, 1966                      3 Sheets-Sheet 1

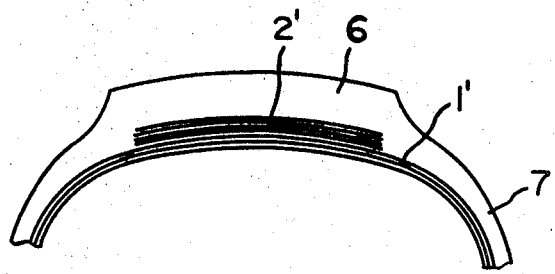
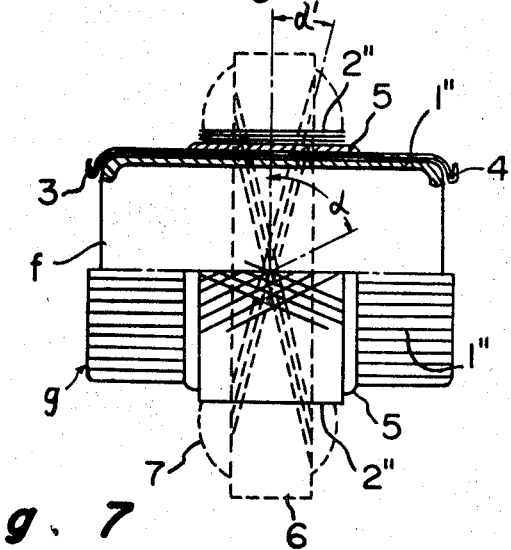
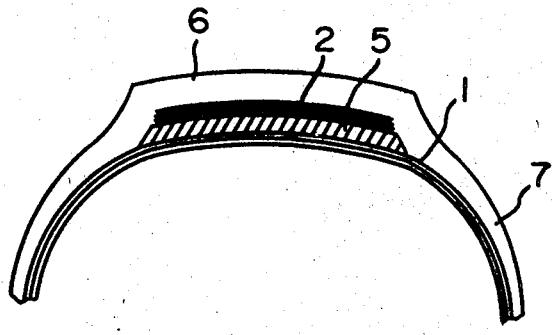

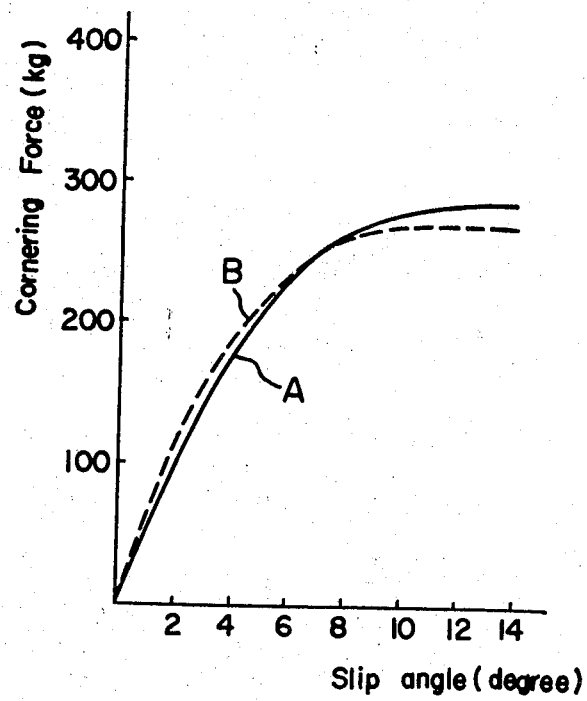

United States Patent Office 3,525,654
Patented Aug. 25, 1970

3,525,654
METHOD OF MANUFACTURING A RADIAL TIRE AND PNEUMATIC TIRE MANUFACTURED THEREBY
Hiroshi Uotani, Hiroyasu Iwamoto, and Masayoshi Kuroda, Kodaira, Tokyo, Japan, assignors to Bridgestone Tire Company Limited, Tokyo, Japan
Filed Mar. 21, 1966, Ser. No. 535,957
Int. Cl. B29h 17/26; B60c 9/16, 9/22
U.S. Cl. 156—124     8 Claims

ABSTRACT OF THE DISCLOSURE

A method of forming a radial tire comprising applying basic carcass cord plies normal to the mid-circumferential plane of a cylindrical former, adhering an annular rubber layer having a thickness of about 3 mm. and a Shore hardness of not less than 50° on the outer surface of said carcass cord plies, laminating thereon at least two reinforcing belt cord plies having an original large cord angle, applying tread stock thereon to form a cylindrical green case, deforming and shaping said circumferential green case to a toroidal form until the cord angle of said reinforcing belt decreases to an angle of from 20 to 30° with respect to the direction of rotation of said tire, and vulcanizing said tire.

---

This invention relates to methods of manufacturing pneumatic vehicle tires, more particularly improved methods of manufacturing pneumatic radial tires for vehicle use, and radial tires having excellent features manufactured thereby.

In general, a radial tire comprises a basic carcass member having cords disposed along radial directions radiating from the center of rotation, and a reinforcing belt member made of rubberized cords and disposed substantially normal to said basic carcass member so as to surround the outer periphery of the crown portion of tire at the position of the breaker of an ordinary tire.

The aforementioned reinforcing belt member of a conventional radial tire was usually formed in a shape of a flat endless belt by laminating at least two rubberized plies of so-called "cord fabric" at an angular relation, each of said rubberized plies containing cords inserted at a cord angle $\alpha'$ of 15 to 20 degrees. It should be understood that cord angle means an angle between the rotational direction of the tire and the direction of the cord.

Such reinforcing belt member serves to restrain elongation of the tire in the rotational direction resulting in excellent running characteristics, such as an extremely high cornering force, and also the belt member materially improves high speed running characteristics of vehicles.

However, the manufacturing process of such radial tires was rather more complicated than that of normal tires. In a process of manufacturing normal tires, a bias cord ply having a bias angle H, which is an angle between the longitudinal direction of the cord in the bias cord ply and rotational direction of the tire is applied on a cylindrical former at first, and then inflated into the shape of a normal tire while decreasing said cord angle, say to H'. It is very difficult to reduce said bias angle H to the grade of said cord angle $\alpha'$ due to the high resistance of said bias plies against such extensive deformation. Therefore it was not possible to apply such process of manufacturing normal tires for the manufacture of radial tires. Instead, two separate shaping steps have been taken in manufacturing radial tires; that is, firstly a basic carcass member is formed by applying a rubberized ply on a smooth surface of a cylindrical former so that the cords in said rubberized ply may be laid in parallel with the axis of rotation of the tire and inflating said rubberized plies thus formed; and secondly, a reinforcing belt member prepared separately so as to have dimensions almost identical to those in the finished tire is bonded to said basic carcass member thus formed and inflated. In other words, the cord angle $\alpha'$ is not varied in the conventional process of manufacturing radial tires, and hence additional separate devices have been necessary to carry out such two step shaping process, resulting in a considerable increase of manufacturing cost and relatively low efficiency.

Therefore, the principal object of the invention is to obviate such difficulties in the conventional method of manufacturing radial vehicle tires and to obtain a novel and efficient method by using a cylindrical former and by single shaping process similar to that of normal tires. The present invention is obtained based on years of study of the shaping conditions of radial tire by using a cylindrical former and in accordance wtih substantially same carcass shaping procedure as that of the normal tire.

For a better understanding of the invention, reference is taken to the accompanying drawings, in which:

FIG. 5 is a partial sectional view illustrating detailed construction of the crown portion of a radial tire manufactured by the conventional method shown in FIG. 4;

FIG. 6 is a diagrammatic illustration of a preferred form of the method of manufacturing a radial tire according to the invention;

FIG. 7 is a similar view of FIG. 5 illustrating the detailed construction of the crown portion of a tire manufactured by the method shown in FIG. 6; and FIG. 8 shows curves representing the magnitudes of cornering forces of a conventional radial tire and a radial tire according to the invention.

Figure 1:
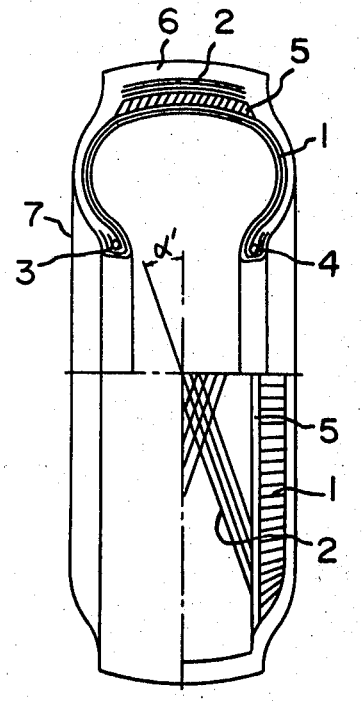
FIG. 1 is a side view of a radial tire embodying the invention partly in section and partly taken away and showing the inside skeleton.
Figure 2:
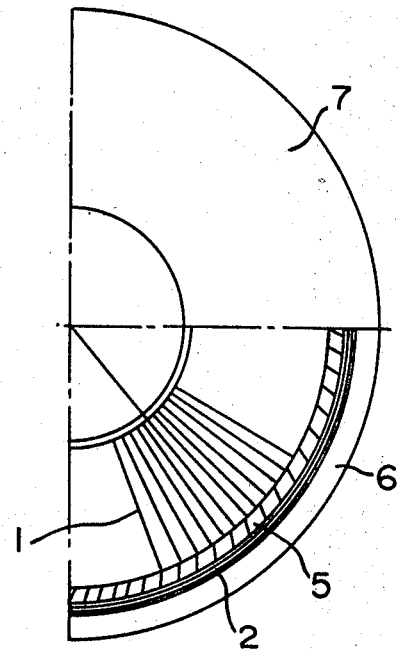
FIG. 2 is a plan view showing one half of the radial tire of FIG. 1, wherein a quarter thereof is shown in the skeleton by removing the outermost surface layer.

Referring to FIGS. 1, 2 and 7 showing construction of a radial tire according to the invention, the reference numeral 1 designates a basic carcass member comprising cords disposed along radial directions radiating from the center of rotation of the tire, 2 a reinforcing belt member, 3 and 4 beads located at both sides of said basic carcass member to facilitate engagement of the tire to a rim of a wheel, 5 an annular rubber layer to be described hereinafter, 6 crown portion of the tire, 7 side walls and $\alpha'$ a cord angle of the reinforcing member.

Figure 3:
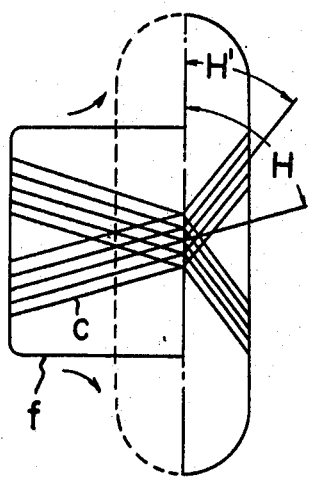
FIGS. 3 and 4 are diagrammatic illustrations showing conventional methods of manufacturing a normal tire comprising a bias ply carcass and a radial tire respectively.
Figure 4:
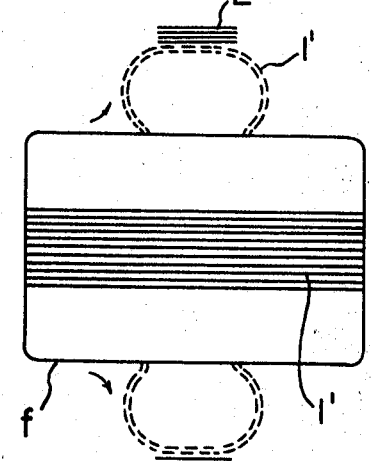

FIG. 3 illustrates a method of producing a normal tire, in which bias plies are applied to a former $f$ at first as shown in the left-hand side half of the figure, and then the bias plies are expanded and inflated as shown in the right-hand side half thereof. The bias angle H of each cord $c$ in the original bias plies are reduced to H' after the above inflation. On the other hand, the cord angle $\alpha'$ in the reinforcing member of a conventional radial tire should be less than 20 degrees. It has been very difficult to reduce the bias angle H to such a small cord angle on the order of less than 20 degrees. Therefore, a two step process as shown in FIG. 4 has been utilized heretofore to manufacture a radial tire, in which the basic carcass member is formed on the former $f$ and then inflated as shown by dotted lines in FIG. 4. Thereafter, a separately prepared reinforcing belt member 2' is applied on the crown portion of the basic carcass member thus prepared, as illustrated in FIGS. 4 and 5.

The invention is to provide a novel method of manufacturing a radial tire in a single shaping process.

Referring to FIG. 6, cord plies 1" are applied to the outer surface of a cylindrical former $f$ so that the cords constituting said plies 1" may be disposed in parallel with the axial center line of the former $f$, and then beads 3, 4 are mounted at both side edges of the cylindrical cord plies 1" thus applied on the former. An annular rubber layer 5 having a width equivalent to or slightly wider than that of a rubberized cord ply 2" for the reinforcing belt member 2 is adhered directly to the outer surface of the central portion of said cord plies 1", and two or more rubberized cord plies 2" are applied directly on the outer surface of said annular rubber layer 5 in order to form the reinforcing belt member 2.

The bias angle $\alpha$ of each cord ply 2" should be so selected as to intersect with the rotational direction of the tire at the most suitable cord angle $\alpha'$, which is between 20 to 30 degrees, preferably between 25 to 30 degrees, when the tire is completed. The cord plies 2" should be laminated to each other to form a layer while disposing the cords in adjacent plies symmetrically with respect to the circumferential center line of the tire.

After the cord plies 2" are adhered, additional treatments, such as formation of treads, are carried out. Then, the thus processed cord plies are removed from the former $f$ to produce a green case $g$ as shown in the lower half of FIG. 6. A finished tire is obtained by treating such green case $g$ by a device for shaping and vulcanizing.

In the course of the vulcanizing process, the generally cylindrical green case $g$ is shaped to form the desired tire shape by means of expansion of bladders placed in the shaping and vulcanizing device and, in the meantime, the green case is pressed and heated by the same device.

In the preferred form of the invention, the material and dimensions of the annular rubber layer 5 to be inserted in the central crown portion of the carcass should be selected by considering various factors, such as the size of the tire, required properties of the same, the cord angle and the cord pitch of the reinforcing belt members and the thickness of superposing a plurality of such reinforcing belt members, thickness of the belt members, etc. It should be noted here that the deformation of the cord plies 2" to the reinforcing belt members 2 having a cord angle not greater than 35 degrees is made possible in a single step process by the fact that said annular rubber belt is inserted between the cord plies 1" for the basic carcass member and other plies 2" for the reinforcing belt member.

It has been ascertained by the inventors through experiments that such a single step shaping process of manufacturing a radial tire can be used instead of a conventional double step process as long as the cord angle $\alpha'$ in the reinforcing belt member 2 is allowed to be larger than 20 degrees.

It has been also found that when an annular rubber layer 5 is sandwiched between the basic carcass member 1 and the reinforcing belt member 2, the rigidity of the crown portion of the tire was increased to improve the cornering force of the tire, and that such improvement in the properties of a radial tire is attainable even for larger cord angles than those commonly used heretofore. Besides, it was proved that such reinforcing belt member having a large cord angle is effective to absorb shocks due to collision with irregular objects on the street, which has been rather troublesome with conventional radial tires having small cord angles.

It was found by the inventors that the preferable hardness of the annular rubber belt 5 was not less than that of the coating rubber of the basic carcass member 1 or not less than 50 degrees in Shore hardness.

The invention will now be described in further detail by taking examples.

EXAMPLE 1

A passenger car tire of 700–14 size was made by using a reinforcing belt member 2 comprising six rayon cord plies superposed on each other, said rayon cord plies consisting of rayon cords disposed at a bias angle of 53 degrees and 36 cords per 5 cm., each said rayon cord being made by twisting three threads of 1,650 deniers. The annular rubber layer 5 in said tire was vulcanized to give a Shore hardness of 58 degrees and its thickness was 3 mm. and its width was slightly wider than that of the reinforcing belt member 2. The basic carcass member 1 to provide radial cords in the tire was made of two rayon cord plies superposed on each other, each rayon cord in said cord plies being made by twisting two threads of 1,650 deniers. A green case comprising said basic carcass member 1, said annular rubber belt 5, and said reinforcing belt member 2 was shaped and vulcanized by a vulcanizing device while inserting in a suitable mold, and a finished tire having a reinforcing belt member with a cord of 25 degrees, which was larger than that of conventional radial tires by about 10 degrees, was obtained.

The cornering force of the radial tire thus obtained was measured, and compared with those of conventional radial tires. The results are shown in FIG. 8, in which the ordinate represents the cornering force in kg. and the abscissa the slip angle. The tests were carried out with the inner pressure of 1.7 kg./cm.$^2$ and the load of 440 kg.

It is apparent from FIG. 8 that the operating characteristics of the tire of the invention represented by curve A are substantially equivalent to those of conventional radial tires represented by curve B.

EXAMPLE 2

A radial tire having a reinforcing belt member 2 with a cord angle of 22 degrees was obtained by shaping and vulcanizing a green case in a similar manner to Example 1, said green case having a reinforcing belt member material consisting of 4 rubberized glass cord plies with a bias angle of 51 degrees.

EXAMPLE 3

A raidal tire having a reinforcing belt member 2 with a cord angle of 22 degrees was obtained by shaping and vulcanizing a green case in the same manner as Example 1, said green case having a reinforcing belt member material consisting of 2 rubberized steel cord plies with a bias angle of 53 degrees.

The hardness of annular rubber layer 5 is selected between 50 to 90° in Shore hardness. In the described Examples 2 and 3, a rubber having a hardness of 68 to 70° is used.

As described in the foregoing, according to the invention, the annular rubber layer 5 inserted between the reinforcing belt member 2 and the basic carcass member 1 acts to reduce considerably the resistance against deformation of cord plies in the reinforcing belt member 2 during the shaping process of the green case, thereby it is made possible to produce a radial tire in a single shaping process of shaping and vulcanizing a cylindrical green case. Thus, radial tires can be manufactured at a high efficiency while using conventional devices for producing tires without any modifications thereof.

In addition, according to the invention, the rigidity of the crown portion of the tire is improved by inserting an annular rubber layer 5 between the reinforcing belt member 2 and the basic carcass member 1, thereby the effects of a large cord angle in excess of that in conventional radial tires can be compensated to bring about a cornering force equivalent to that of conventional radial tires. The radial tires of the invention using a large cord angle have an advantage in that mechanical shocks experienced when an automobile is running on a street can be absorbed by the tire of the invention without sacrificing excellent cornering characteristics thereof. A variety of performance characteristics of the radial tire of the invention can be obtained by selecting proper material and size of the annular rubber layer 5 and cords in the reinforcing belt member 2.

Furthermore, in the method of manufacturing radial tires according to the invention, it is possible to use ordinary tire formers $f$ having a drum diameter larger than the bead diameter of the tire by 23 to 76 mm. The drum diameter of the tire was selected according to the tire size and the cord angle. For instance, a tire having a reinforcing belt member 2 with a cord angle of 20 degrees can be manufactured more easily by using a former having a drum diameter larger than that of the beads 3, 4 by 76 mm. The green case prepared by using such a former having a drum diameter larger than that of beads has a rectangular cross section along the diameter of the tire, which means that the diameter of the reinforcing belt portion of the green case is larger than that of the bead, thereby the degree of deformation of the reinforcing belt member is reduced to facilitate the shaping thereof. The difference between the drum diameter of the former $f$ and the bead diameter of the tire can be selected in a suitable manner depending on the dimensions of tires to be manufactured.

The cord plies to be used in the reinforcing belt member 2 according to the invention should be made of inextensible material having a high tensile strength, such as steel cord plies and glass cord plies.

The preferable cord angle of the reinforcing belt member at tire crown portion is between 20 and 30 degrees in case of one layer of reinforcing belt member 2 is used at tire crown portion.

It is also possible to use second reinforcing layer having 30 to 45 degrees of cord angle to improve the stiffness.

The reason for limiting the cord angle of the reinforcing belt member 2 to 30 to 20 degrees in the invention is due to the fact that if the cord angle exceeds 30 degrees, the excellent performance characteristics of the radial tire cannot be obtained, while if the cord angle is selected to be less than 20 degrees, it is difficult to shape such belt member from bias cord plies in a single shaping process.

What we claim is:

1. A method of manufacturing a radial tire comprising the steps of applying basic carcass cord plies on the outer surface of a cylindrical former so that each cord of said carcass cord plies extends normal to a mid-circumferential plane of said cylindrical former, adhering an annular rubber layer having a thickness of about 3 mm. and having a Shore hardness of not less than 50° on one outer surface of said carcass cord plies, then laminating thereon at least two cord plies forming reinforcing belt members on the crown portion of said tire, said belt cord plies having an original large cord angle which is so selected as to intersect the rotational direction of the completed tire at an angle of 20 to 30° in alternate directions, applying tread stock thereon to form a cylindrical green case, deforming and shaping said cylindrical green case to a toroidal form until the cord angle of said cords in said reinforcing belt members decreases from said original large cord angle to a final cord angle of from 20 to 30° with the direction of rotation of said tire and vulcanizing said tire.

2. The method of claim 1 wherein said cords of said reinforcing belt member are rubberized steel cord plies, said original large cord angle is approximately 53° and wherein said final cord angle is approximately 22°.

3. The method of claim 1 wherein said final angle is from 25 to 30°.

4. The method of claim 1 wherein said cord plies of said reinforcing belt member are rubberized glass cord plies, said original large cord angle is approximately 51° and said final cord angle is approximately 22°.

5. The method of claim 1 wherein said cord plies of said reinforcing belt member are rayon cord plies, said original large cord angle is approximately 53° and said final cord angle is approximately 25°.

6. The method of claim 1 wherein said annular rubber layer has a Shore hardness of from 50 to 90°.

7. The method of claim 1 wherein said cords in said reinforcing belt member are inextensible.

8. The method according to claim 1 wherein the width of the annular rubber layer is at least as wide as the reinforcing belt member.

References Cited

UNITED STATES PATENTS

| | | | |
|---|---|---|---|
| 1,493,674 | 5/1924 | Hopkinson | 156—133 |
| 1,871,438 | 8/1932 | Abbott | 156—133 |
| 3,294,143 | 12/1966 | Frazier | 152—361 |
| 3,374,131 | 3/1968 | Gough | 156—133 |

FOREIGN PATENTS 608,013 11/1960 Canada.

JOHN T. GOOLKASIAN, Primary Examiner

C. B. COSBY, Assistant Examiner

U.S. Cl. X.R.

152—330; 156—133